(12) United States Patent
Fukaya

(10) Patent No.: US 10,495,355 B2
(45) Date of Patent: *Dec. 3, 2019

(54) THERMOACOUSTIC ELECTRIC GENERATOR SYSTEM

(71) Applicant: CENTRAL MOTOR WHEEL CO., LTD., Anjo-shi, Aichi (JP)

(72) Inventor: Noriyuki Fukaya, Miyoshi (JP)

(73) Assignee: CENTRAL MOTOR WHEEL CO., LTD., Anjo-shi (JP)

( * ) Notice: Subject to any disclaimer, the term of this patent is extended or adjusted under 35 U.S.C. 154(b) by 143 days.

This patent is subject to a terminal disclaimer.

(21) Appl. No.: 15/564,709

(22) PCT Filed: Mar. 22, 2016

(86) PCT No.: PCT/JP2016/058902
§ 371 (c)(1),
(2) Date: Oct. 5, 2017

(87) PCT Pub. No.: WO2016/185782
PCT Pub. Date: Nov. 24, 2016

(65) Prior Publication Data
US 2018/0073780 A1   Mar. 15, 2018

(30) Foreign Application Priority Data
May 21, 2015   (JP) .................. 2015-103521

(51) Int. Cl.
*F25B 9/14*   (2006.01)
*F02G 1/043*   (2006.01)

(52) U.S. Cl.
CPC ............ *F25B 9/145* (2013.01); *F02G 1/043* (2013.01)

(58) Field of Classification Search
USPC .......................................... 62/6; 290/1 R, 52
See application file for complete search history.

(56) References Cited

U.S. PATENT DOCUMENTS

| | | | | |
|---|---|---|---|---|
| 4,355,517 A | * | 10/1982 | Ceperley | F02G 1/043 60/517 |
| 6,560,970 B1 | * | 5/2003 | Swift | F25B 9/14 60/520 |
| 6,711,905 B2 | * | 3/2004 | Howard | F02G 1/0435 62/6 |

(Continued)

FOREIGN PATENT DOCUMENTS

| | | |
|---|---|---|
| CN | 101539124 A | 9/2009 |
| CN | 104214062 A | 12/2014 |

(Continued)

*Primary Examiner* — Pedro J Cuevas
(74) *Attorney, Agent, or Firm* — Oliff PLC

(57) ABSTRACT

A thermoacoustic electric generator system includes: a turbine including a turbine blade provided in an inside of a branched tube in a tube component and rotating by thermoacoustic oscillation of working gas in a thermoacoustic engine, and a turbine rotational shaft configured to be coupled to the turbine blade, penetrate a tube wall of the branched tube, and extend from the inside to an outside thereof; and a generator provided on the outside of the branched tube in the tube component, coupled to the turbine rotational shaft of the turbine, and converting rotational energy of the turbine blade to electric energy.

5 Claims, 4 Drawing Sheets

(56) References Cited

U.S. PATENT DOCUMENTS

| | | | | |
|---|---|---|---|---|
| 8,205,459 | B2* | 6/2012 | Garner | F25B 9/145 |
| | | | | 62/6 |
| 8,375,729 | B2* | 2/2013 | Schwartz | F25B 9/145 |
| | | | | 62/215 |
| 8,499,563 | B2* | 8/2013 | Asturias | F03G 7/05 |
| | | | | 310/311 |
| 8,806,875 | B2* | 8/2014 | Watanabe | F25B 9/145 |
| | | | | 62/6 |
| 9,664,181 | B2* | 5/2017 | Steiner | F03G 7/002 |
| 9,759,157 | B2* | 9/2017 | Miyairi | F02G 1/043 |
| 9,777,951 | B2* | 10/2017 | Hasegawa | F25B 9/145 |
| 9,869,303 | B2* | 1/2018 | Miyairi | F03G 7/00 |
| 10,113,440 | B2* | 10/2018 | Fukaya | F01D 1/04 |
| 2003/0188541 | A1* | 10/2003 | Howard | F02G 1/0435 |
| | | | | 62/6 |
| 2008/0060364 | A1* | 3/2008 | Watanabe | F25B 9/145 |
| | | | | 62/6 |
| 2011/0121583 | A1* | 5/2011 | Asturias | F03G 7/05 |
| | | | | 290/1 R |
| 2014/0338369 | A1 | 11/2014 | Hasegawa et al. | |
| 2018/0073383 | A1* | 3/2018 | Fukaya | F01D 1/04 |
| 2019/0085833 | A1* | 3/2019 | Fukaya | F02G 1/055 |

FOREIGN PATENT DOCUMENTS

| | | |
|---|---|---|
| JP | 2011-122765 A | 6/2011 |
| JP | 2014-234949 A | 12/2014 |
| WO | 2013/084830 A1 | 6/2013 |
| WO | 2014/196452 A1 | 12/2014 |

* cited by examiner

THERMOACOUSTIC ELECTRIC GENERATOR SYSTEM

TECHNICAL FIELD

The invention relates to a thermoacoustic electric generator system for generating electric energy using a thermoacoustic engine that induces thermoacoustic oscillation of working gas.

BACKGROUND ART

Conventionally, efficient energy use has been promoted in various industrial fields. However, a rate of exhaust heat, which is exhausted and wasted from facilities such as factories and vehicles, for example, still remains high. Thus, a technique of efficiently collecting thermal energy has been desired. In the earnest investigation into this technique, the present inventor has focused his attention on use of a thermoacoustic engine capable of inducing thermoacoustic oscillation of working gas. One example of a system (hereinafter also referred to as a "thermoacoustic electric generator system") that generates electric energy using this thermoacoustic engine has been disclosed in PCT/JP/2012-081193.

The thermoacoustic engine used in this thermoacoustic electric generator system includes: a stack configured by including plural channels; a hot heat exchanger provided at one end of each of the channels in the stack; and a cold heat exchanger provided at the other end of each of the channels in the stack. This thermoacoustic engine induces thermoacoustic oscillation of working gas, which is enclosed in a tube, through generation of a temperature gradient between both of the ends of the channel in the stack, and thus can generate acoustic energy. Furthermore, this thermoacoustic electric generator system is configured to include a linear generator in a branched tube, which is branched from an annular tube, drive this generator using the acoustic energy generated in the thermoacoustic engine, and thereby generate electric energy.

SUMMARY OF THE INVENTION

The thermoacoustic electric generator system as described above is advantageous in terms of points of high energy conversion efficiency and use of the simply structured thermoacoustic engine that does not have movable members such as a piston and a valve. Meanwhile, the linear generator is used to generate the electric energy using the thermoacoustic oscillation of the working gas, which is generated in the thermoacoustic engine. However, use of the linear generator is disadvantageous in terms of cost because this linear generator itself is expensive. In regard to designing of this type of the system, it is desired to create a system with high practicality by adopting a generator with superior cost efficiency and superior maintainability.

The invention has been made in view of the above points, and one of purposes of the invention is to provide a technique of effectively reducing cost and improving maintainability of a generator for generating electric energy in a thermoacoustic electric generator system that generates the electric energy using thermoacoustic oscillation of working gas induced in a thermoacoustic engine.

In order to achieve the above purpose, a thermoacoustic electric generator system (100) according to the invention includes a tube component (101), a thermoacoustic engine (110), a turbine (140), and a generator (150). The tube component (101) includes: an annular tube (102) configured to be annular; and a branched tube (103) branched from the annular tube (102) and communicating with the annular tube (102), and specified working gas is enclosed in both of the annular tube (102) and the branched tube (103). The thermoacoustic engine (110) includes: a stack (111) incorporated in an inside of the annular tube (102) in the tube component (101) and having plural channels (111c), each of which extends in a tube longitudinal direction; and heat exchangers (112, 113) exchanging heat with the working gas such that a temperature gradient is generated between both ends of each of the plural channels (111c) in the stack (111), so as to cause thermoacoustic oscillation of the working gas. The turbine (140) includes: a turbine blade (145) provided in an inside of the branched tube (103) in the tube component (101) and rotating by the thermoacoustic oscillation of the working gas in the thermoacoustic engine (110); and a turbine rotational shaft (144) configured to be coupled to the turbine blade (145), penetrate a tube wall of the branched tube (103), and extend from the inside to an outside thereof. The generator (150) is provided on the outside of the branched tube (103) in the tube component (101), is coupled to the turbine rotational shaft (144) of the turbine (140), and converts rotational energy of the turbine blade (145) to electric energy. In this case, the turbine (140) and the generator (150) constitute a turbine-type generator.

According to the thermoacoustic electric generator system of this configuration, the turbine-type generator including the turbine and the generator is cheaper than a linear generator. Thus, cost required for the generator can be cut. In addition, the turbine rotational shaft of the turbine extends from the inside to the outside of the branched tube. In this way, in a state of being arranged on the outside of the branched tube, the generator can be coupled to the turbine rotational shaft. In this case, as a result of facilitated detachment of the generator from the turbine, maintainability of the generator is improved.

The thermoacoustic electric generator system (100) of the above configuration is preferably configured to include a generator housing (151) having: an accommodation space (151a), in which the generator (150) is accommodated in an airtight state; and a communication hole (152a) for communicating the accommodation space (151a) with the inside of the branched tube (103). In this configuration, the turbine rotational shaft (144) of the turbine (140) is coupled to the generator (150) in the accommodation space (151a) through the communication hole (152a) of the generator housing (151). In this case, while a part of the turbine rotational shaft extends from the inside to the outside of the branched tube, an extended portion is accommodated in a tightly sealed state in the accommodation space of the generator housing. Accordingly, a dedicated shaft seal structure to the turbine rotational shaft does not have to be provided, and thus a structure related to the turbine rotational shaft can be simplified.

In the thermoacoustic electric generator system (100) of the above configuration, the branched tube (103) preferably includes a crank tube section (106) that is bent in a crank shape, and the turbine rotational shaft (144) of the turbine (140) is preferably configured to extend in the same direction as an axial direction of the branched tube (103) while penetrating a tube wall of the crank tube section (106). According to this configuration, a space occupied by the generator, which is coupled to the turbine rotational shaft, in a direction to cross the axial direction of the branched tube can be reduced in size.

In the thermoacoustic electric generator system (100) of the above configuration, the turbine (140) is preferably configured that a cross-sectional area (Sb) of a turbine channel in the turbine blade (145) is equal to a tube cross-sectional area (Sa) of a transverse section of the branched tube (103) or falls below the tube cross-sectional area (Sa). According to this configuration, the cross-sectional area of the channel, through which a oscillatory wave of the working gas flows, is not enlarged when the oscillatory wave thereof is introduced from the branched tube to the turbine. In this case, reductions in flow velocity amplitude and pressure amplitude, which are caused by an increase in the cross-sectional area of the channel, can be suppressed. As a result, the appropriate flow velocity amplitude and the appropriate pressure amplitude that reliably cause a rotary operation of the turbine blade of the turbine can be obtained.

In the thermoacoustic electric generator system (100) of the above configuration, the turbine (140) preferably includes an introductory section (148) for introducing the oscillatory wave of the working gas toward the turbine blade (145), and the introductory section (148) preferably has an inclined surface (148a) that is inclined at a specified angle from 14 degrees to 30 degrees with respect to an axis of the turbine rotational shaft (144). According to this introductory section, the oscillatory wave of the working gas can be drawn to the turbine blade without dampening acoustic energy received from the oscillatory wave as much as possible.

Note that, in the above description, in order to facilitate understanding of the invention, components of the invention that correspond to those of the embodiment are denoted by the reference signs used in the embodiment in parentheses. However, each of the components of the invention is not limited to that in the embodiment defined by the reference sign.

As it has been described so far, according to the invention, in the thermoacoustic electric generator system that generates electric energy using the thermoacoustic oscillation of the working gas generated in the thermoacoustic engine, maintainability thereof can be improved while cost required for the generator generating the electric energy can be cut.

MODES FOR CARRYING OUT THE INVENTION

A detailed description will hereinafter be made on one embodiment of the invention with reference to the drawings. Note that, in said drawings, in regard to each component of the same element that is denoted by the same reference sign for the description, a reference sign thereof for the description is omitted when necessary.

Figure 1:
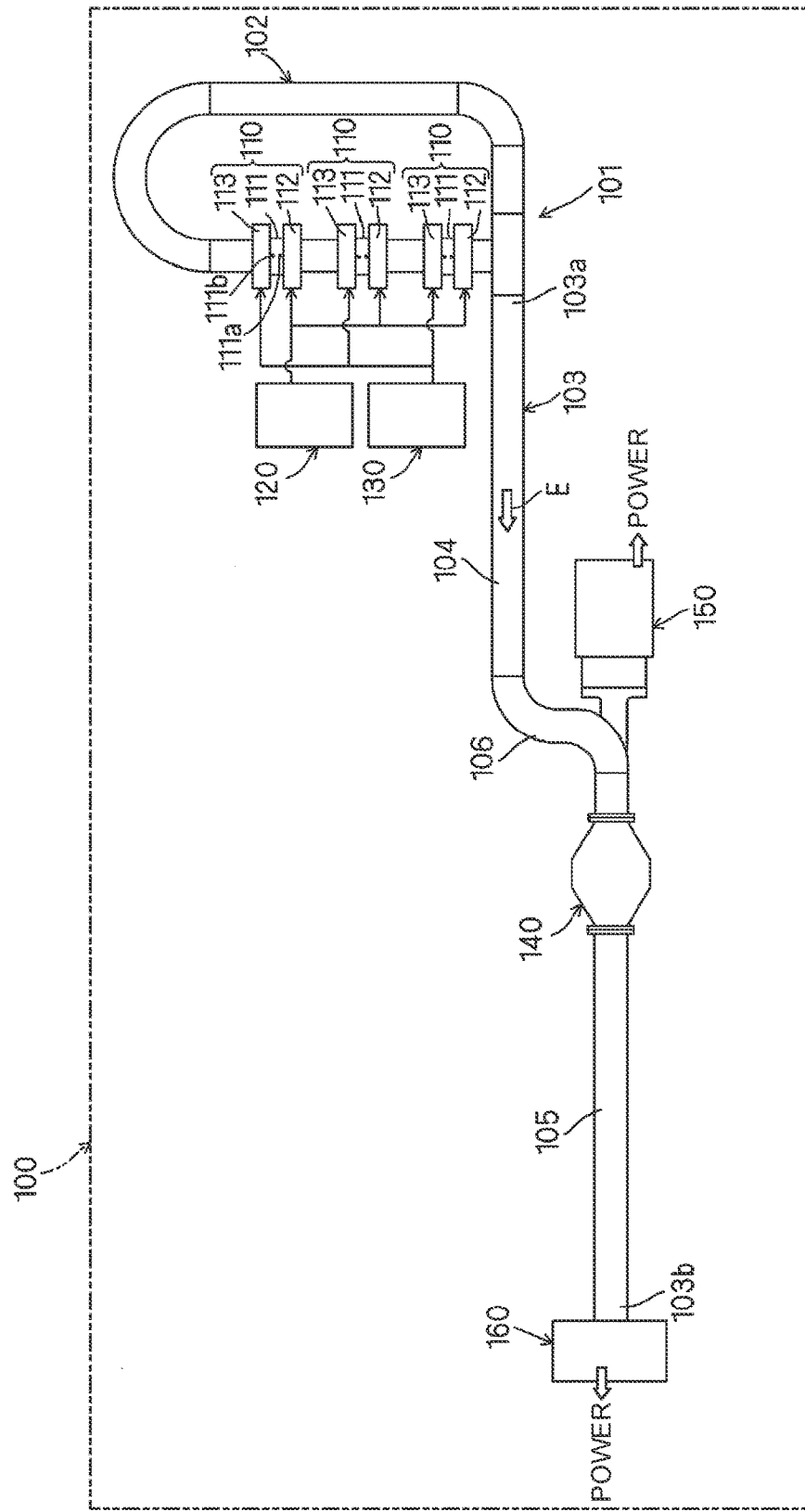
FIG. 1 is a schematic view of an overview of a thermoacoustic electric generator system according to the invention.

As shown in FIG. 1, a thermoacoustic electric generator system 100 includes a tube component 101 that is configured by including metallic tubes. This tube component 101 is configured by including: an annular tube 102 as an annular (loop) tube portion; and a branched tube 103 that is branched from the annular tube 102 and, an internal space of which communicates with an internal space of the annular tube 102. This tube component 101 corresponds to the "tube component" of the invention. In addition, the annular tube 102 and the branched tube 103 respectively correspond to the "annular tube" and the "branched tube" of the invention. Note that the annular tube 102 of the tube component 101 only needs to be annular, and any of various shapes such as a circle, an oval, and a polygon can be adopted as a shape thereof in a side view.

The branched tube 103 has one end 103a as a branched point that is branched from the annular tube 102, and is a tube portion that extends lengthwise from this one end 103a to the other end 103b. The branched tube 103 is closed at the other end 103b by an energy extraction section 160, and specified working gas (helium in this embodiment) is thereby enclosed under a specified pressure in both of the annular tube 102 and the branched tube 103. Note that, instead of or in addition to helium, nitrogen, argon, mixed gas of helium and argon, air, or the like can be used as the working gas.

The annular tube 102 of the tube component 101 is provided with three thermoacoustic engines (also referred to as "motors") 110 that are connected in series. These three thermoacoustic engines 110 constitute a so-called "multi-stage thermoacoustic engine". Each of the thermoacoustic engines 110 includes: a stack 111 incorporated in an inside of the annular tube 102; a hot heat exchanger 112 arranged to oppose one end 111a as a high-temperature section of the stack 111; and a cold heat exchanger 113 arranged to oppose the other end 111b as a normal-temperature section (or a low-temperature section) of the stack 111. The thermoacoustic engine 110 herein corresponds to the "thermoacoustic engine" of the invention. Note that the number of installment of this thermoacoustic engine 110 is not limited to three, and another number of the installment can be selected when necessary.

Figure 2:
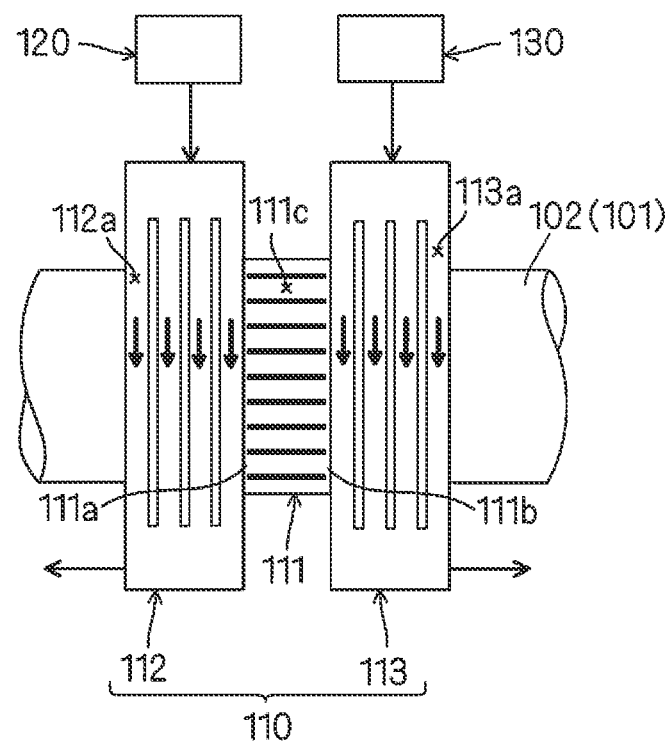
FIG. 2 is a schematic view of a structure of a thermoacoustic engine in the thermoacoustic electric generator system in FIG. 1.

As shown in FIG. 2, each of the stack 111 is configured as a structure having plural channels 111c that extend in parallel with each other from the one end 111a to the other end 111b along a tube longitudinal direction (a tube extending direction) of the annular tube 102. When a specified temperature gradient is generated between the one end 111a and the other end 111b of this stack 111, the working gas in the annular tube 102 becomes unstable to induce thermoacoustic oscillation thereof. In this way, oscillatory waves (also referred to as "sound waves", a "vibration flow", or a "work flow") are produced by vertical waves that vibrate in parallel with an advancing direction of the working gas, and such oscillatory waves transfer from the inside of the annular tube 102 to an inside of the branched tube 103. As this stack 111, a honeycomb structure made of ceramics, a structure in which thin mesh sheets made of stainless steel are stacked in parallel at fine pitches, a nonwoven fabric-like material made of metallic fiber, or the like can typically be used. This stack 111 corresponds to the "stack" of the invention.

Each of the hot heat exchangers 112 is connected to a heating source 120. The heating source 120 fulfills a function of supplying a heating medium such as hot air or hot water to each of the hot heat exchangers 112. Each of the hot heat exchangers 112 is configured as a heat exchanger for heating that includes: a passage 112a, through which the relatively high-temperature heating medium flows; and a passage (not shown), through which the relatively low-temperature working gas flows, and that can move heat from the heating medium to the working gas through heat exchange between the heating medium and the working gas. In this way, the working gas situated around the one end 111a of each of the stack 111 is heated by the heating medium supplied from the heating source 120 to each of the hot heat exchangers 112.

Each of the cold heat exchangers 113 is connected to a cooling source 130. The cooling source 130 fulfills a function of supplying a cooling medium such as cold wind, cold water, or atmospheric air to each of the cold heat exchangers 113. Each of the cold heat exchangers 113 is configured as a heat exchanger for cooling that includes: a passage 113a, through which the relatively low-temperature cooling medium flows; and a passage (not shown), through which the relatively high-temperature working gas flows, and that can move the heat from the working gas to the cooling medium through the heat exchange between the working gas and the cooling medium. In this way, the working gas situated around the other end 111b of each of the stack 111 is cooled by the cooling medium supplied from the cooling source 130 to each of the cold heat exchangers 113.

The specified temperature gradient is generated between the one end 111a and the other end 111b of each of the stack 111 through cooperation of a heating effect by the above hot heat exchanger 112 and a cooling effect by the above cold heat exchanger 113. The hot heat exchanger 112 and the cold heat exchanger 113 described above serve as the heat exchanger that exchanges the heat with the working gas such that the temperature gradient is generated between both ends of each of the plural channels 111c in each of the stack 111 in order to induce the thermoacoustic oscillation of the working gas enclosed in the tube component 101. These hot heat exchanger 112 and cold heat exchanger 113 constitute the "heat exchanger" of the invention.

Returning to FIG. 1, the branched tube 103 includes: a first tube section 104 that extends linearly between the annular tube 102 and a turbine 140; a second tube section 105 that extends linearly on an opposite side of the turbine 140 from the annular tube 102; and a crank tube section 106 that is bent in a crank shape to couple the first tube section 104 and the second tube section 105.

Although details will be described below, the turbine 140 is configured to communicate with the inside of the branched tube 103 and fulfills a function to convert acoustic energy (also referred to as "vibration energy"), which is generated by the oscillatory waves of the working gas flowing through the branched tube 103, to mechanical rotational energy. That is, this turbine 140 is provided in the branched tube 103 and rotates when receiving the acoustic energy, which is generated by the thermoacoustic oscillation of the working gas in the thermoacoustic engines 110. A generator 150 that converts kinetic energy (the rotational energy) by the rotation of this turbine 140 to electric energy is connected to the turbine 140. The turbine 140 and the generator 150 herein respectively correspond to the "turbine" and the "generator" of the invention. These turbine 140 and generator 150 constitute a turbine-type generator (a generator corresponding to the "turbine generator" of the invention) that is driven by the turbine to generate the electric energy.

The other end 103b of the branched tube 103, that is, a tube end on an opposite side from the turbine 140 of tube ends on both sides of the second tube section 105 is provided with the energy extraction section 160 that extracts the acoustic energy of the working gas from the branched tube 103 to an outside of the tube. This energy extraction section 160 is typically constructed of the known linear generator, a speaker-type generator, or the like capable of receiving pressure vibration to output electrical energy (the electric energy). Furthermore, instead of the energy extraction section 160, a vibration absorbing material (sponge, urethane, or the like) capable of absorbing the vibration of the working gas may be installed at the other end 103b of the branched tube 103.

Figure 3:
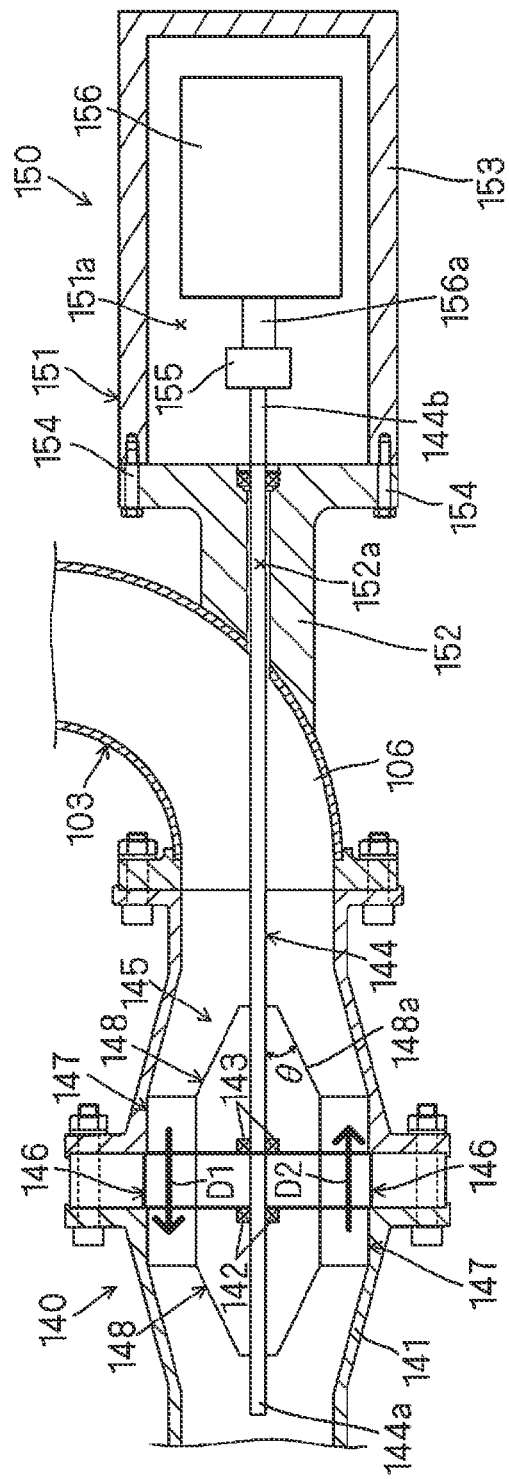
FIG. 3 is a view of a cross-sectional structure of a portion of a turbine generator in the thermoacoustic electric generator system in FIG. 1.

As shown in FIG. 3, the turbine 140, which constitutes the turbine generator, includes a turbine housing 141, a turbine rotational shaft 144, and a turbine blade 145. The turbine housing 141 is a portion that accommodates a part of the turbine rotational shaft 144 and the turbine blade 145 and that constitutes a part of the branched tube 103, and communicates with both of the second tube section 105 and the crank tube section 106 in the branched tube 103. The turbine rotational shaft 144 is configured as a cylindrical member that is supported via bearings 142, 143 in a manner capable of rotating axially. This turbine rotational shaft 144 is configured to extend lengthwise from one end 144a, which is located in the turbine housing 141, that is, in the branched tube 103, to the other end 144b by penetrating a tube wall of the crank tube section 106 from the inside to the outside of the branched tube 103 in the tube longitudinal direction, that is, in the same direction as an axial direction of the branched tube 103 (a direction in which the tube extends). This turbine rotational shaft 144 is coupled to the turbine blade 145 and serves as a rotation center of this turbine blade 145. By adopting the configuration that this turbine rotational shaft 144 extends in the same direction as the axial direction of the branched tube 103, a space occupied by the generator 150, which is coupled to this turbine rotational shaft 144, in a direction to cross the axial direction of the branched tube 103 can be reduced in size. This turbine rotational shaft 144 corresponds to the "turbine rotational shaft" of the invention.

The turbine blade 145 is provided in the branched tube 103 (the crank tube section 106), receives the acoustic energy generated by the thermoacoustic oscillation of the working gas in the thermoacoustic engines 110, and rotates by an effect of an impulsive force thereof. This turbine blade 145 includes: a toric rotor blade section 146 fixed to the turbine rotational shaft 144; toric fixed blade sections 147 that interpose the rotor blade section 146 therebetween and are arranged on both sides thereof; and a cone section 148 provided on an opposite side of each of the fixed blade sections 147 from the rotor blade section 146. This turbine blade 145 is configured as a rotary vane including the rotor blade section 146 that integrally rotates with the turbine rotational shaft 144. Accordingly, the turbine 140, which has the turbine blade 145, is also referred to as an "impulsive turbine". This turbine blade 145 corresponds to the "turbine blade" of the invention.

Figure 4:
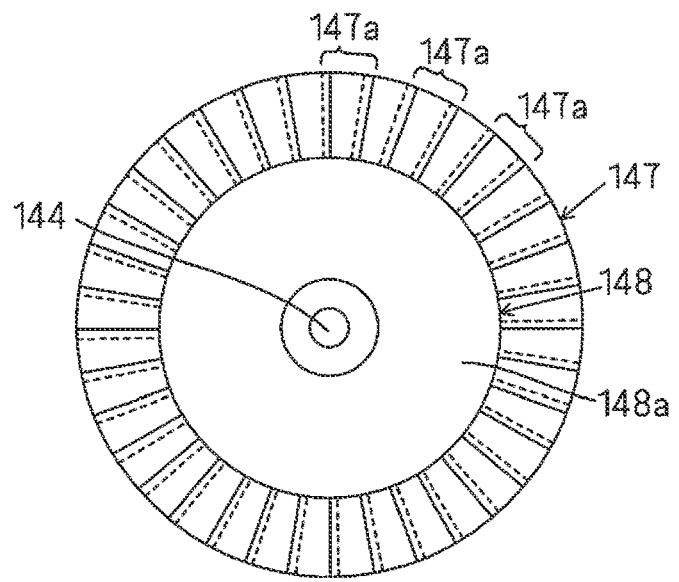
FIG. 4 is a view of a turbine blade that is seen in a cross-sectional direction.

The fixed blade section 147 does not rotate even when the rotor blade section 146 rotates. As shown in FIG. 4, in this fixed blade section 147, plural blades 147a that extend in a radial direction are arranged at constant intervals in a circumferential direction, and a circulation space, in which the working gas can circulate, is formed between two each of these plural blades 147a.

With reference to FIG. 3 and FIG. 4, the cone section 148 has a conical shape, an outer diameter of which is gradually reduced as separating from the corresponding fixed blade section 147, an outer surface thereof constitutes an inclined surface 148a that is inclined to an axis of the turbine rotational shaft 144. The inclined surface 148a of the cone section 148 fulfills a function of smoothly introducing the oscillatory wave of the working gas toward the fixed blade section 147. According to this cone section 148, the oscillatory wave of the working gas can be introduced into the fixed blade section 147 at a specified entry angle θ (an acute angle defined by the inclined surface 148a, which is inclined along the outer surface of the cone section 148, and the axis of the turbine rotational shaft 144). This cone section 148 corresponds to the "introductory section" of the invention.

Figure 5:
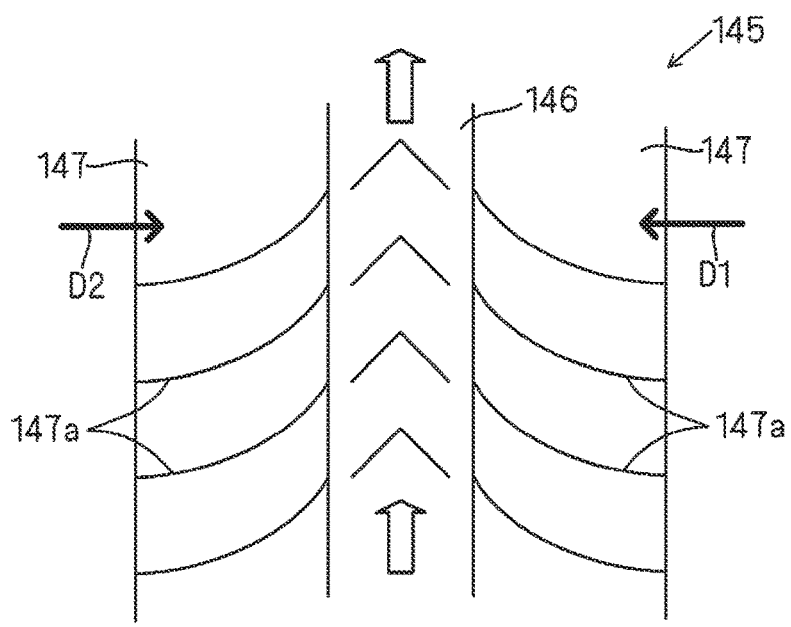
FIG. 5 is a schematic view of a structure of the turbine blade.

The turbine blade 145 configured as above is a so-called "bidirectional turbine blade" and, as shown in FIG. 5, is configured that, in either of cases where the working gas flows in a first direction indicated by an arrow D1 and the working gas flows in a second direction (a reverse direction of the first direction) indicated by an arrow D2, the working gas flows into the rotor blade section 146 through the circulation space of the fixed blade section 147 and that the rotor blade section 146 thereby rotates in the specified one direction.

Returning to FIG. 3, the generator 150, which constitutes the turbine generator, is provided on the outside of the branched tube 103 in the tube component 101, is coupled to the turbine rotational shaft 144 of the turbine 140, and fulfills a function of converting the rotational energy of the turbine blade 145 to the electric energy. This generator 150 includes a generator housing 151. This generator housing 151 includes: a first housing section 152 that is joined to the crank tube section 106 by welding; and a second housing section 153 that is attached to the first housing section 152 via a bolt member 154. This generator housing 151 corresponds to the "generator housing" of the invention.

In this generator housing 151, when the second housing section 153 is attached to the first housing section 152, an accommodation space 151a for accommodating an electric motor 156 as a component of the generator 150 in an airtight state is formed. The first housing section 152 is provided with a communication hole 152a for communicating the accommodation space 151a with the inside of the crank tube section 106 in the branched tube 103.

In the turbine 140, a portion of the turbine rotational shaft 144 that is located on the outside of the branched tube 103 is introduced into the accommodation space 151a through the communication hole 152a of the generator housing 151, and the other end 144b is coupled to a motor shaft 154a of the electric motor 156 by a coupling section 155. That is, the turbine blade 145 of the turbine 140 is coupled to the generator 150 via the turbine rotational shaft 144. According to this generator 150, in the case where the turbine rotational shaft 144 rotates axially due to mechanical rotary motion of the turbine 140, a motor shaft 154a rotates due to the rotary motion of this turbine rotational shaft 144, and the electric motor 156 thereby generates electricity. In this case, the electric motor 156 fulfills a function as a substantial generator.

While a part of the turbine rotational shaft 144 in the turbine 140 extends from the inside to the outside of the branched tube 103, the extended portion is accommodated in a tightly sealed state in the accommodation space 151a of the generator housing 151. As a result, the entire turbine rotational shaft 144 is placed in a tightly sealed region from the inside of the branched tube 103 to the accommodation space 151a of the generator housing 151. Accordingly, a dedicated shaft seal structure to the turbine rotational shaft 144 does not have to be provided, and thus a structure related to the turbine rotational shaft 144 can be simplified.

The above coupling section 155 can easily detach the generator 150 from the turbine 140 when necessary by canceling coupling between the other end 144b of the turbine rotational shaft 144 and a motor shaft 156a of the electric motor 156. As described above, in the turbine 140 of this embodiment, the turbine rotational shaft 144 extends from the inside to the outside of the branched tube 103. In this way, in a state of being arranged on the outside of the branched tube 103, the generator 150 can be coupled to the other end 144b of the turbine rotational shaft 144. In this case, as a result of facilitated detachment of the generator 150 from the turbine 140, maintainability of the generator 150 is improved. In addition, according to the above coupling section 155, the other end 144b of the turbine rotational shaft 144 is coupled to a motor shaft of another motor instead of the electric motor 156. Thus, the electric motor (the generator) that is coupled to the turbine 140 can be replaced with an optimum motor in accordance with capacity and the like of the turbine 140. In this way, electric energy generation capacity of the turbine generator can easily be changed.

The above turbine 140 at least has two following characteristics (a first characteristic and a second characteristic) in order to realize a smooth rotary operation of the turbine blade 145.

As the first characteristic of the turbine 140, a cross-sectional area of a turbine channel for the working gas in the turbine blade 145 (a cross-sectional area of a channel in which the working gas flows from one of the fixed blade section 147 to the other fixed blade section 147 through the rotor blade section 146 in FIG. 5) is configured to be equal to a tube cross-sectional area (a channel cross-sectional area) Sa of a transverse section of the branched tube 103 (the crank tube section 106) or to be smaller than this tube cross-sectional area Sa. According to this first characteristic, the channel cross-sectional area is not enlarged when the oscillatory wave of the working gas is introduced from the branched tube 103 to the turbine 140. In this case, reductions in flow velocity amplitude and pressure amplitude, which are caused by an increase in the channel cross-sectional area, can be suppressed. As a result, in the turbine 140, the appropriate flow velocity amplitude and the appropriate pressure amplitude that reliably cause the rotary operation of the turbine blade 145 can be obtained.

As the second characteristic of the turbine 140, it is configured to select an angle in a range from 14 degrees to 30 degrees as the entry angle θ that is defined by the cone section 148. According to this second characteristic, the working gas can be drawn to the turbine blade 145 without dampening acoustic energy E by the working gas as much as possible.

Next, a description will be made on an operation of the thermoacoustic electric generator system 100 with the above configuration on the basis of the above description.

As shown in FIG. 1, in each of the thermoacoustic engines 110, when the one end 111a of the stack 111 is heated by the hot heat exchanger 112, and the other end 111b of the stack 111 is cooled by the cold heat exchanger 113, a temperature difference occurs between the one end 111a as a high-temperature side region and the other end 111b as a low-temperature side region in the stack 111. Due to this temperature difference, the oscillatory wave is primarily generated from the thermoacoustic oscillation of the working gas in each of the stack 111. The acoustic energy E (the vibration energy) of this oscillatory wave (the sound wave) is transferred from the annular tube 102 of the tube component 101 to the turbine 140 through the branched tube 103, and is further transferred to the energy extraction section 160. In this case, the branched tube 103 is configured as a resonance tube (a wave guide tube) for guiding the acoustic energy E of the working gas that is generated in the thermoacoustic engines 110. The acoustic energy E is partially extracted by the turbine 140 as energy extraction means and converted to the electrical energy (the electric energy) by the generator 150, which is connected to said turbine 140, and is also partially extracted by the energy extraction section 160 and converted to specified energy (for example, the vibration energy, the electrical energy, or the like).

The invention is not only limited to the above typical embodiment, and various applications and modifications thereof can be considered without departing from the purpose of the invention. For example, each of the following embodiments, for which the above embodiment is applied, can also be implemented.

The description has been made on the case where the two heat exchangers (the hot heat exchanger 112 and the cold heat exchanger 113) are provided for the stack 111 in order to generate the specified temperature gradient between the one end 111a and the other end 111b of the stack 111 in the thermoacoustic engine 110 of the above embodiment. However, as long as the above temperature gradient can be realized in the invention, either one heat exchanger of the hot heat exchanger 112 and the cold heat exchanger 113 can be removed.

In the above embodiment, the description has been made on the configuration that the turbine rotational shaft 144 of the turbine 140 extends in the same direction as the axial direction of the branched tube 103. However, instead of this configuration, the invention can also adopt a configuration that a member corresponding to the turbine rotational shaft 144 extends in a crossing direction of the axial direction of the branched tube 103.

In the above embodiment, the description has been made on the case where the cross-sectional area of the turbine channel for the working gas in the turbine blade 145 is configured to be equal to the tube cross-sectional area of the branched tube 103 or to be smaller than this tube cross-sectional area. However, the invention can also adopt a configuration that the cross-sectional area of the turbine channel in the turbine blade 145 exceeds the tube cross-sectional area of the branched tube 103.

In the above embodiment, the description has been made on the case where the turbine 140 includes the cone section 148 that fulfills the function of introducing the working gas toward the turbine blade 145. However, in the invention, a structure that corresponds to the cone section 148 in the turbine 140 can also be removed when necessary. In addition, the entry angle θ of the working gas, which is defined by the inclined surface 148a of the cone section 148, preferably falls within the range from 14 degrees to 30 degrees as described above. However, in the case where the working gas in a desired state can be drawn into the turbine blade 145, the entry angle θ may be set to a value that does not fall within the range from 14 degrees to 30 degrees.

REFERENCE SIGNS LIST

100/THERMOACOUSTIC ELECTRIC GENERATOR SYSTEM
101/TUBE COMPONENT
102/ANNULAR TUBE
103/BRANCHED TUBE
103a/ONE END
103b/THE OTHER END
104/FIRST TUBE SECTION
105/SECOND TUBE SECTION
106/CRANK TUBE SECTION
110/THERMOACOUSTIC ENGINE
111/STACK
112/HOT HEAT EXCHANGER
113/COLD HEAT EXCHANGER
120/HEATING SOURCE
130/COOLING SOURCE
140/TURBINE
141/TURBINE HOUSING
144/TURBINE ROTATIONAL SHAFT
145/TURBINE BLADE
146/ROTOR BLADE SECTION
147/FIXED BLADE SECTION
148/CONE SECTION (INTRODUCTORY SECTION)
150/GENERATOR
151/GENERATOR HOUSING
156/ELECTRIC MOTOR
160/ENERGY EXTRACTION SECTION

The invention claimed is:

1. A thermoacoustic electric generator system comprising:
a tube component that is configured by including an annular tube configured to be annular and a branched tube branched from the annular tube and communicating with the annular tube and, in which specified working gas is enclosed in both of the annular tube and the branched tube;
a thermoacoustic engine that includes: a stack incorporated in an inside of the annular tube in the tube component and having plural channels, each of which extends in a tube longitudinal direction; and a heat exchanger exchanging heat with the working gas such that a temperature gradient is generated between both ends of each of the plural channels in the stack, so as to cause thermoacoustic oscillation of the working gas;
a turbine that includes: a turbine blade provided in an inside of the branched tube in the tube component and rotating by the thermoacoustic oscillation of the working gas in the thermoacoustic engine; and a turbine rotational shaft configured to be coupled to the turbine blade, penetrate a tube wall of the branched tube, and extend from the inside to an outside thereof; and
a generator provided on the outside of the branched tube in the tube component, coupled to the turbine rotational shaft of the turbine, and converting rotational energy of the turbine blade to electric energy.

2. The thermoacoustic electric generator system according to claim 1 further comprising:
a generator housing that has: an accommodation space, in which the generator is accommodated in an airtight state; and a communication hole for communicating the accommodation space with the inside of the branched tube, wherein
the turbine rotational shaft is coupled to the generator in the accommodation space through a communication hole of the generator housing.

3. The thermoacoustic electric generator system according to claim 1, wherein
the branched tube includes a crank tube section that is bent in a crank shape, and
the turbine rotational shaft of the turbine is configured to extend in the same direction as an axial direction of the branched tube while penetrating a tube wall of the crank tube section.

4. The thermoacoustic electric generator system according to claim 1, wherein
the turbine is configured that a cross-sectional area of a turbine channel for the working gas in the turbine blade is equal to a tube cross-sectional area of a transverse section of the branched tube or falls below the tube cross-sectional area.

5. The thermoacoustic electric generator system according to claim 1, wherein
the turbine includes an introductory section for introducing a oscillatory wave of the working gas toward the turbine blade, and the introductory section has an inclined surface that is inclined at a specified angle from 14 degrees to 30 degrees with respect to an axis of the turbine rotational shaft.

* * * * *